(12) United States Patent
Rynderman et al.

(10) Patent No.: US 10,021,434 B2
(45) Date of Patent: Jul. 10, 2018

(54) MOVIE PACKAGE FILE FORMAT

(71) Applicant: Apple Inc., Cupertino, CA (US)

(72) Inventors: Michel A. Rynderman, San Jose, CA (US); Christopher L. Flick, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/498,146

(22) Filed: Sep. 26, 2014

(65) Prior Publication Data

US 2015/0350703 A1 Dec. 3, 2015

Related U.S. Application Data

(60) Provisional application No. 62/006,013, filed on May 30, 2014.

(51) Int. Cl.
| | |
|---|---|
| *H04N 7/173* | (2011.01) |
| *H04N 7/16* | (2011.01) |
| *H04N 21/2343* | (2011.01) |
| *H04N 21/4788* | (2011.01) |
| *H04N 21/458* | (2011.01) |
| *H04N 21/2747* | (2011.01) |

(Continued)

(52) U.S. Cl.
CPC ........... *H04N 21/23439* (2013.01); *H04N 21/234327* (2013.01); *H04N 21/2402* (2013.01); *H04N 21/26258* (2013.01); *H04N 21/2747* (2013.01); *H04N 21/4126* (2013.01); *H04N 21/44209* (2013.01); *H04N 21/458* (2013.01); *H04N 21/4788* (2013.01)

(58) Field of Classification Search
None
See application file for complete search history.

(56) References Cited

U.S. PATENT DOCUMENTS 7,676,142 B1 * 3/2010 Hung ............... G11B 27/005
348/446
7,676,825 B2 * 3/2010 Chevallier ............ G06Q 30/08
725/104

(Continued)

FOREIGN PATENT DOCUMENTS

WO 2015/015140 A1 2/2015

OTHER PUBLICATIONS

Invitiation to Pay Additional Fees, dated Aug. 4, 2015, from corresponding International Application No. PCT/US2015/032446, filed May 25, 2015.

(Continued)

*Primary Examiner* — Mushfikh Alam
(74) *Attorney, Agent, or Firm* — Baker & Hostetler LLP

(57) ABSTRACT

Systems and methods for improved video formats used in delivery and playback are presented. According to an embodiment, the movie package format contains tiers that provide for multiple sets of movie variations that are individually selectable for transfer to a device for local playback. A locally stored movie package may contain any subset of available tiers for a movie. Non-resident tiers can be discovered and downloaded into the movie package as needed or when available. Tiers, and other movie files may be updated or added to the movie package at any time. Then users can request updates or the updates can be pushed to the user without affecting the previously downloaded files.

45 Claims, 7 Drawing Sheets

(51) Int. Cl.
*H04N 21/262* (2011.01)
*H04N 21/24* (2011.01)
*H04N 21/41* (2011.01)
*H04N 21/442* (2011.01)

(56) References Cited

U.S. PATENT DOCUMENTS

| | | | | |
|---|---|---|---|---|
| 8,260,951 | B2* | 9/2012 | Chen | H04L 67/104 370/351 |
| 8,341,255 | B2 | 12/2012 | Gopalakrishnan | |
| 8,352,996 | B2 | 1/2013 | Khouzam et al. | |
| 8,364,296 | B2* | 1/2013 | Wilhelm | G11B 27/10 455/502 |
| 8,615,157 | B1* | 12/2013 | Isaacson | G11B 27/105 386/241 |
| 8,776,153 | B2* | 7/2014 | Ansari | H04N 1/324 725/95 |
| 8,867,401 | B1* | 10/2014 | Tomay | H04N 21/25808 370/228 |
| 8,943,215 | B2* | 1/2015 | Patten | H04L 65/608 709/231 |
| 8,959,244 | B2* | 2/2015 | Lin | G06Q 30/0241 709/231 |
| 9,742,870 | B2* | 8/2017 | Karuppiah | H04L 67/327 |
| 2004/0261094 | A1* | 12/2004 | Huslak | H04N 7/152 725/25 |
| 2005/0034153 | A1* | 2/2005 | Abramson | H04N 5/445 725/32 |
| 2008/0134258 | A1* | 6/2008 | Goose | H04N 7/17336 725/91 |
| 2008/0244648 | A1* | 10/2008 | Arfvidsson | G06F 17/30241 725/38 |
| 2009/0113496 | A1* | 4/2009 | Kummer | H04N 7/17327 725/87 |
| 2010/0186025 | A1* | 7/2010 | Thomas | G06F 3/0481 725/5 |
| 2010/0186038 | A1* | 7/2010 | Thomas | G06F 17/3082 725/42 |
| 2010/0228862 | A1 | 9/2010 | Myers | |
| 2010/0257569 | A1* | 10/2010 | O'Hanlon | G11B 27/10 725/110 |
| 2010/0306373 | A1 | 12/2010 | Wormley | |
| 2011/0004899 | A1* | 1/2011 | Medford | H04N 21/23476 725/32 |
| 2011/0246621 | A1* | 10/2011 | May, Jr. | H04N 7/17318 709/219 |
| 2012/0110628 | A1* | 5/2012 | Candelore | H04N 21/234327 725/110 |
| 2012/0192234 | A1 | 7/2012 | Britt et al. | |
| 2012/0284804 | A1 | 11/2012 | Lindquist et al. | |
| 2013/0111520 | A1* | 5/2013 | Lo | H04L 67/306 725/35 |
| 2013/0239153 | A1* | 9/2013 | Deakin | H04N 5/765 725/88 |
| 2014/0059244 | A1* | 2/2014 | Panje | H04N 21/234363 709/231 |
| 2014/0282772 | A1* | 9/2014 | Chen | H04N 21/26258 725/97 |
| 2014/0304377 | A1 | 10/2014 | Andersson et al. | |
| 2015/0095460 | A1 | 4/2015 | Berger et al. | |
| 2015/0215571 | A1* | 7/2015 | Greene | H04N 5/765 386/326 |
| 2015/0279424 | A1* | 10/2015 | Marck | G11B 27/036 386/285 |
| 2016/0080833 | A1* | 3/2016 | Denoual | H04N 21/234327 725/116 |
| 2016/0182941 | A1* | 6/2016 | Crabtree | H04N 21/23106 725/115 |

OTHER PUBLICATIONS

International Patent Application No. PCT/US2015/032446; Int'l Preliminary Report on Patentability; dated Dec. 15, 2016; 14 pages.

* cited by examiner

100

400

500

600

700

MOVIE PACKAGE FILE FORMAT

CROSS-REFERENCE TO RELATED APPLICATION

This application is a non-provisional application of U.S. Provisional Application Ser. No. 62/006,013, filed May 30, 2014, the contents of which are referenced herein in its entirety.

BACKGROUND

Video and/or audio content is constantly being accessed by users of various handheld and computing devices whether that data is purchased, rented, or requested for download from a server, exchanged between users as in a video conference call, or published for sharing with friends and family. However, given the variety of devices that may access given media content, and the limitations of the multiple and various networks used for accessing and exchanging that media content, multiple versions of the same content are often created and stored. For example, through multiple available versions of a video, different resolutions of the video are provided via multiple created streams or tracks. This allows individuals accessing the video content on a smart phone to view the same video content as individuals accessing the video content on a desktop or television system. Additional considerations such as subtitles in different languages and decoders that are not compatible with an applied coding type may additionally each require a completely different version of the same video content.

Accordingly, there is a need in the art for a flexible and adaptable movie package file format that provides for easy access to any one of the multiple different video streams for use at different display systems. Such a file format provides for systems and methods that create and access video data in a more user-friendly and resource friendly manner.

BRIEF DESCRIPTION OF THE DRAWINGS

The foregoing and other aspects of various embodiments of the present invention will be apparent through examination of the following detailed description thereof, in conjunction with the accompanying drawing figures in which similar reference numbers are used to indicate functionally similar elements.

DETAILED DESCRIPTION

Movie packages provide a new file format for use by standard media players such that movie packages behave like standalone, self-contained media files. A movie package is a reliably playable movie distribution file format that allows for efficient, multi-tiered delivery and playback in both online and offline environments. According to an embodiment, movie packages contain tiers that provide for multiple sets of movie variations that are individually selectable for transfer to a device and for local playback. A locally stored movie package may contain any subset of available tiers for a movie. Non-resident tiers can be discovered and downloaded into the movie package as needed or when available.

According to an embodiment, updating tracks, files, or other parts of a local movie package from a remote source enables users to provide or distribute new media resources, such as additional audio and caption languages to already deployed movie packages without needing to re-download any of the previously delivered media.

According to an embodiment, the movie package format described herein is compatible with HTTP Live Streaming (HLS), allowing the same produced video, audio and other media assets to be used in both a classic HLS deployment and in a movie package.

Figure 1:
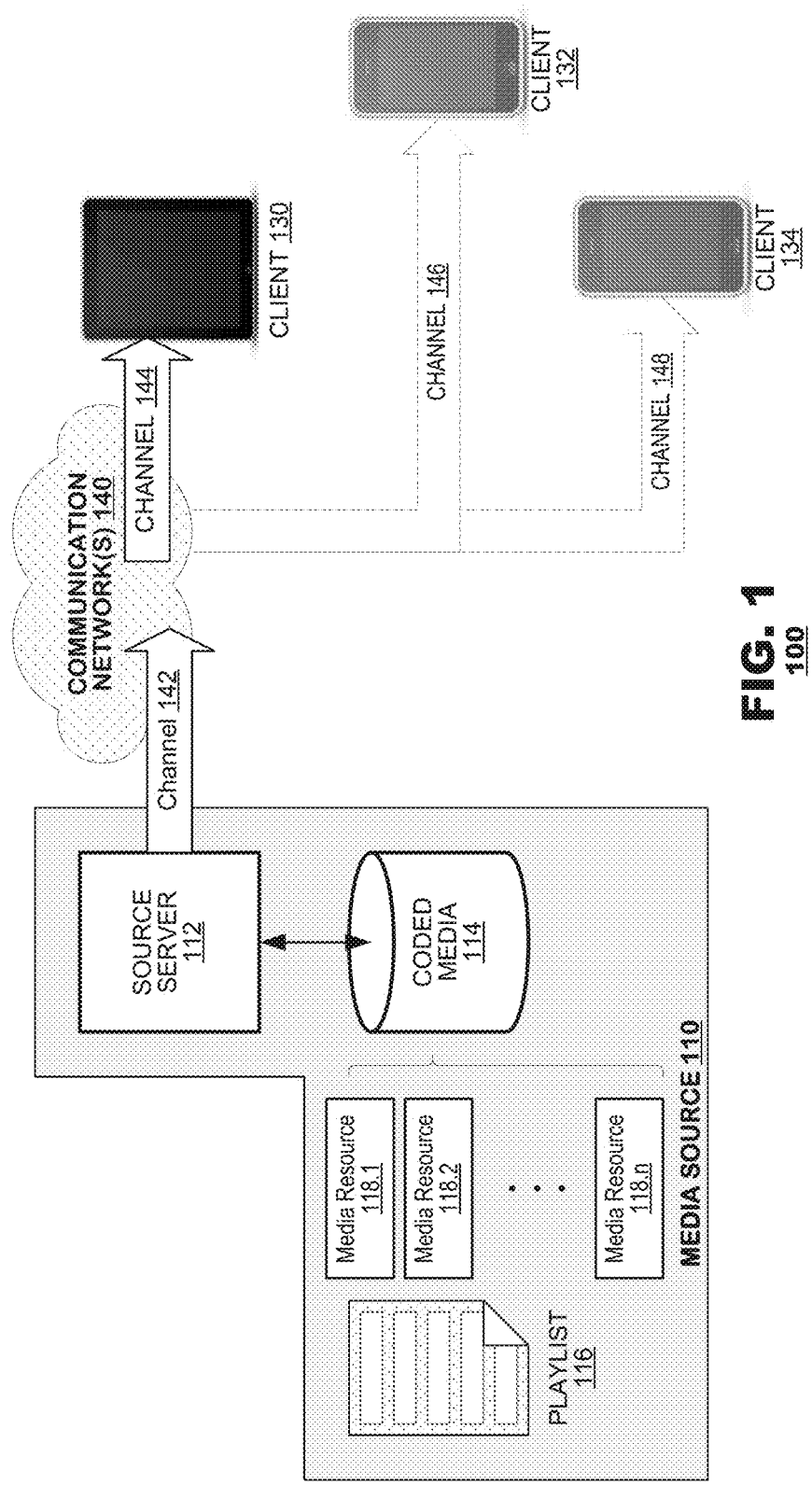
FIG. 1 is a simplified functional block diagram of an exemplary streaming system according to an embodiment of the present invention.

FIG. 1 is a simplified functional block diagram of an exemplary streaming system 100 according to an embodiment of the present invention. The system may include a media source 110 and one or more client devices 130 interconnected via a communication network 140.

The media source 110 may include a source server 112 that performs processing operations on behalf of the stored media data. A storage system 114 stores the movie package master playlist 116 for the movie and the available media resources 118.1-118.n as part of the coded media data. The client device(s) 130 represent media players that download movie packages from the media source 110, decode the coded media resources and render them for playback. A media source 110 may generate the movie package master playlist 116 to identify segments or tracks of the movie packages that are stored by a server 112 of the media source 110. The media source 110 may transmit the media resources 118.1-118.n to entities on the communication network 140 via a channel 142.

Figure 2:
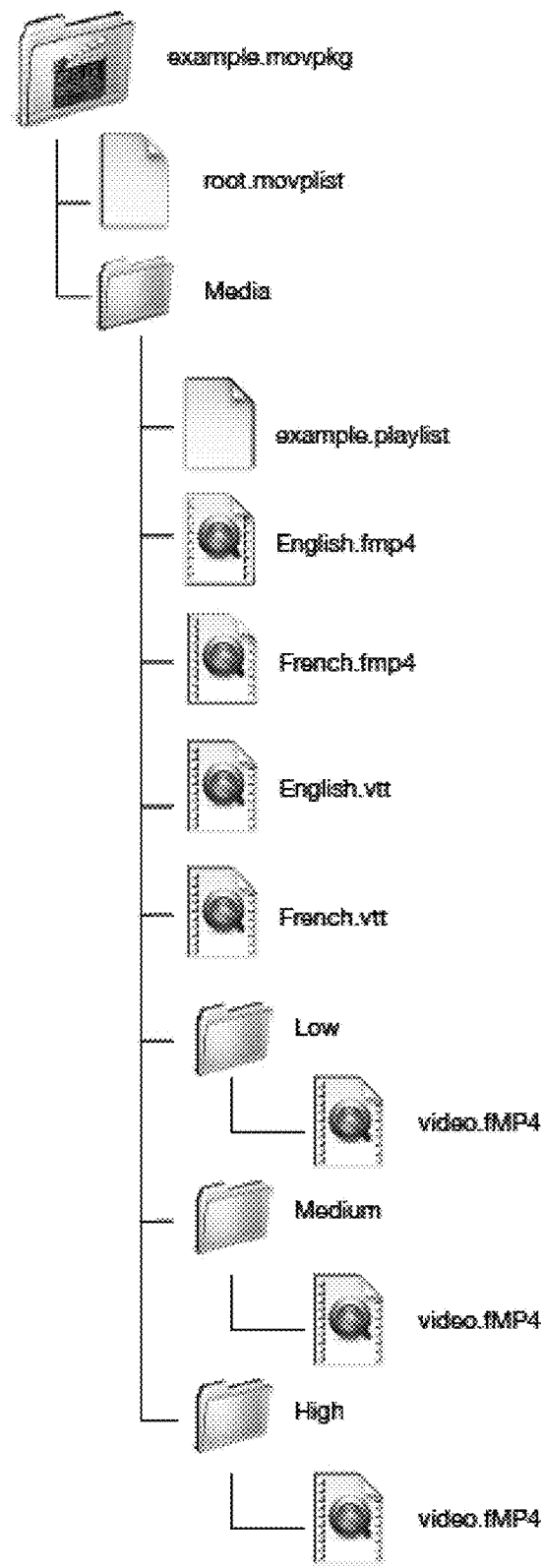
FIG. 2 illustrates an exemplary movie package according to an embodiment of the present invention.

FIG. 2 illustrates an exemplary movie package according to an embodiment of the present invention. As shown in FIG. 2, a movie package is a movie that appears as a single file system object (example.movpkg). Although a movie package acts as a directory containing various media resources and related bookkeeping, the internal details of the movie package are hidden from the casual user, thereby allowing users to interact with movie packages as if they were conventional movie files.

A movie package is intended to hold all the media data for a single movie and includes global metadata for the movie. A movie package may include multiple sets of media tracks or files. The availability of media tracks determines the availability of the kinds of media associated with the movie presentation e.g. video, audio, captions, languages, commentaries, metadata, and so on. According to an embodiment, the movie package will contain HLS compatible media files.

A movie package contains media organized into one or more variations called tiers or variants. Tiers may be provided to cover a range of data rates, visual dimensions, codecs, or other aspects related to some measure of quality of the video data.

As shown in FIG. 2, movie packages have a top-level directory (example.movpkg) with a specific pathname extension (.movpkg, although other pathname extensions may be defined); an assigned Uniform Type Identifier so that applications can reference the format; a set of media resources (e.g., media files and files describing relationships among files) in a Media subdirectory of the top-level directory; a principal media resource or master playlist (example-.playlist) that is interpreted in concert with other files in the movie package to construct the movie; and a file in the top-level directory specifying the location of the master playlist and possibly other movie package related information (root.movplist). For applications that interact with a movie package as playable media, the specific pathname extension for the movie package type (.movpkg) could be registered in the system, perhaps by an application or a system framework, to signal the directory is a movie package.

The Media subfolder of the exemplary movie package shown in FIG. 2 contains the following exemplary media resources and subdirectories:

"example.playlist" is a file describing the relationships of media files and the presentation itself. The movie package's "root.movplist" file points at this file as the place to start creating the movie to be played.

"English.fMP4" and "French.fMP4" are fragmented MPEG-4 files holding the English and French audio as movies with single tracks, respectively. In FIG. 2, the .fMP4 file extension is an exemplary file type used to indicate a file is a fragmented MPEG-4 file organized as segments and corresponding to HLS requirements.

"English.vtt" and "French.vtt" are WebVTT files for English and French subtitles, respectively.

The "Low", "Medium" and "High" subdirectories are each directories that contain a fragmented MPEG-4 file called "video.fMP4" holding a version of the video at a different bit rate.

There is no restriction on the names of files or subdirectories within the Media directory or its subdirectories. If filenames would otherwise collide if put in the same directory, additional directories may be introduced or the files may be renamed. For example, the subdirectories for the different bit rates could be eliminated if the individual "video.fMP4" files were renamed. The "Low/video.fMP4" file may be renamed as "low-video.fMP4" for example and the "Low/" directory removed.

Although primarily described with reference to HLS compatible files, other files including documentation, user licenses, and editor/viewer specific states may be stored as part of the movie package.

Each movie package contains a principal media resource called a master playlist that describes the media resources within the movie package and how media resources are organized to build a presentation. The information provided in the master playlist may include the set of tracks, information about those tracks, relationships among tracks needed to determine tiers, the different available tiers and their locations, and the locations of files holding or describing media data. The master playlist may also include information about the individual streams, for example, the media type, the codec, the duration, the groupings for alternates, etc., for the various available streams.

For movie packages compatible with HTTP Live Streaming (HLS), the semantics and terminology used in the master playlist will be consistent with HLS. For example, master playlists for HLS compatible movie fragments may be .m3u8 files.

The master playlist of a movie package may include references to media resources at one or more uniform resource identifiers (URIs) including a local URI, a remote URI, and a resume URI.

A local URI references the locally stored media resource stored in the movie package that is complete and can be played in its entirety by a standard media player. The movie package need not contain every possible media file and stream available for the movie, but should contain at least one complete presentation of the movie. The resource path for a local URI will be relative to the location of the local master playlist file containing the reference and must not extend beyond the movie package's Media directory. If a client device attempts to play a stream referenced by the local URI but some data is missing, the device will turn to the resume or remote URIs to continue playback.

A remote URI references the location of a remote version of a media resource to be retrieved and stored on the local client device. The remote URI can reference any location that might store media data, for example a remote server or other appropriate location. The remote URI may also reference multiple locations from which exact copies of the same media resources may be retrieved, for example, if there are several locations storing the same file, perhaps for failover, file sharing, or other reasons.

A resume URI references a local location for a media resource that can be used during the transfer of the resource from the remote location to the local device. Similar to the local URI, the resume URI must point to a location within the Media directory tree of the movie package. When attempting to play a movie on the local device, the device will first check the local URI location for playable media resources. If the local URI resource is missing, or the media file at the local URI is incomplete, the client device will check if there is a file object at the resume URI location. If there is, it will use an appropriate means to restart the download of the media files from the remote URI to the resume URI location. Playback may resume from the media data stored at the resume URIL location while the download is in process.

Returning to FIG. 1, using the illustrated configuration, users often download video content to a personal computing device 130, such as a smart phone or tablet. The device's capabilities may determine which tier of the movie package is retrieved for playback on that device. For example, a small screen device may not need to retrieve 1080p video for local playback but the 1080p tier would likely be retrieved when the movie package will be displayed on a television. Similarly, the device may retrieve only tiers with media the device can decode (e.g., video with certain encoded profiles/levels).

Additionally, the device may adapt the retrieval of portions of the movie package at different tiers depending on the availability of system resources, such as network bandwidth, as that availability changes. For example, in anticipation of a long plane trip, a user may rent or purchase movies or other video content. The purchase or rental of the movie will then initiate the download of a movie package.

Preliminarily, a movie package skeleton may be downloaded. The movie package skeleton will contain a minimal number of directories and files, including the master playlist that indicates what movie resources are available and can be included in the movie package and from where to retrieve them. DRM-related files may also be included as part of the initial movie package download. Media tracks for the requested video can be provided in separate files as needed. According to an embodiment, separate media tracks will be independently delivered.

The client device 130 may then identify a target media resources from the media source 110. The client 130 may select a media resource (say, media resource 118.2) for delivery and decoding. The media source 110 then furnishes the media resource 118.2 to the client 130 for decoding and rendering. A target media resource may be identified automatically based on user settings, the user's location, user preferences, default settings, or another method of identifying content and media resources for download. Alternatively, the user may choose to download certain resource such as a commentary track.

Although the complete movie might contain video at several different resolutions, audio in multiple languages, and subtitles in still more languages, only the content suitable for the device need be downloaded into the device's local movie package. The other content types may be made available for download but won't necessarily need to be downloaded when the video is initially requested.

The architecture presented in FIG. 1 illustrates entities that are involved in storing and decoding a single coded media stream. This architecture may be expanded to accommodate multiple instances of media sources 110 and clients 130-134. Thus a single media source 110 may code and transmit multiple media streams to multiple clients 130-134. Additionally, a single media source 110 may store and transmit a common media stream in a variety of different bit rates or a variety of different frame sizes to accommodate capabilities of different types of clients. Each coded variant of a media stream may be considered to be a different media resource for purposes of the present discussion.

For video content shared between multiple devices (e.g. client 130 and client 134), the initial requesting device (client 130) may send a reference to the purchased or rented movie package to the second device (client 134), for example, via a local connection (not shown). The second device may then download its own version of the movie package, with the appropriate content and media resources for playback on the second device. For example, if the requesting device is a handheld tablet or smart phone and the second device will display the video content on a larger screen, such as a television, the same audio will be downloaded with the movie package by both devices but 1080p or better HD video will be downloaded by the second device instead of a lower resolution that may be downloaded to the requesting device. Alternatively, according to an embodiment, a portion or all of the movie package may be directly transferred from the initial requesting device to the second device over a local network connection. Using the received movie package, the second device may then retrieve from the remote location any missing information required to display the movie on the second device.

The configuration illustrated in FIG. 1 presents a generalized architecture of the system 100 in which a common network 140 is illustrated as carrying communication from the media source 110 to the client device 130. However, the principles of the present invention find application with a variety of different implementations. In one implementation, the media source 110 and client devices 130-134 may communicate with each other via a common network such as the Internet. In another implementation, the media source 110 may be connected to the to the client device 130 via separate networks (not shown). For example, via a gateway device or router (not shown) connected to the client 130 by a wired or wireless local area network. The gateway device may then be connected to the media source 110 via a wide area network. Thus, the distribution, topology and architecture of the communication network(s) 140 is immaterial to the operation of the present invention unless discussed otherwise herein.

According to an embodiment, movie packages will provide content that is compatible with certain codecs, such as H.264 video and MC audio supported across multiple devices. Additionally, according to an embodiment, within movie packages, only standards-based media file containers will be used, for example, fragmented MP4 and WebVTT as used by HTTP Live Streaming (HLS).

When a movie package is requested, the requesting device may begin downloading the movie over the available network connection. In some situations, for example, at home or in the office, the communications network 140 will be a high-speed internet or a Wi-Fi network and media resources in a tier requiring a high bandwidth will be downloaded. Playback of the movie may occur as soon as sufficient data has been downloaded and/or buffered. The device need not wait for the entire movie package to download before the movie is available for playback. Although the user may be watching the movie as it is streamed to the requested device, there's typically a small buffer of media data downloaded in advance of the playback point. Then, if the requesting device is moved to another network (for example, using LTE while traveling), the requesting device may identify and access a media resource in a lower bandwidth tier of the movie appropriate for the available network. The features of the tiers, including the quality and bandwidth requirements of the media resources in each tier are identified in the master playlist. The master playlist may additionally include information about the playback data rate peaks and valleys of a media resource, for example, by identifying the segments of coded video data that were coded a higher or lower data rate than average. Such information may be presented in an optional data rate "map" that can be included inline or otherwise referenced by the master playlist.

The requesting device may then start downloading the video for a lower bandwidth tier from where it left off with the higher quality tier. There is no need to retrieve any portion of the movie timeline that was previously downloaded at the higher tier; the device will begin download of the new tier where the download of the old tier left off. As previously noted, different display types may use the same media resources, such as an audio track, therefore the audio of the movie may continue uninterrupted when the requesting device switches to the lower quality tier of video data.

Figure 3:
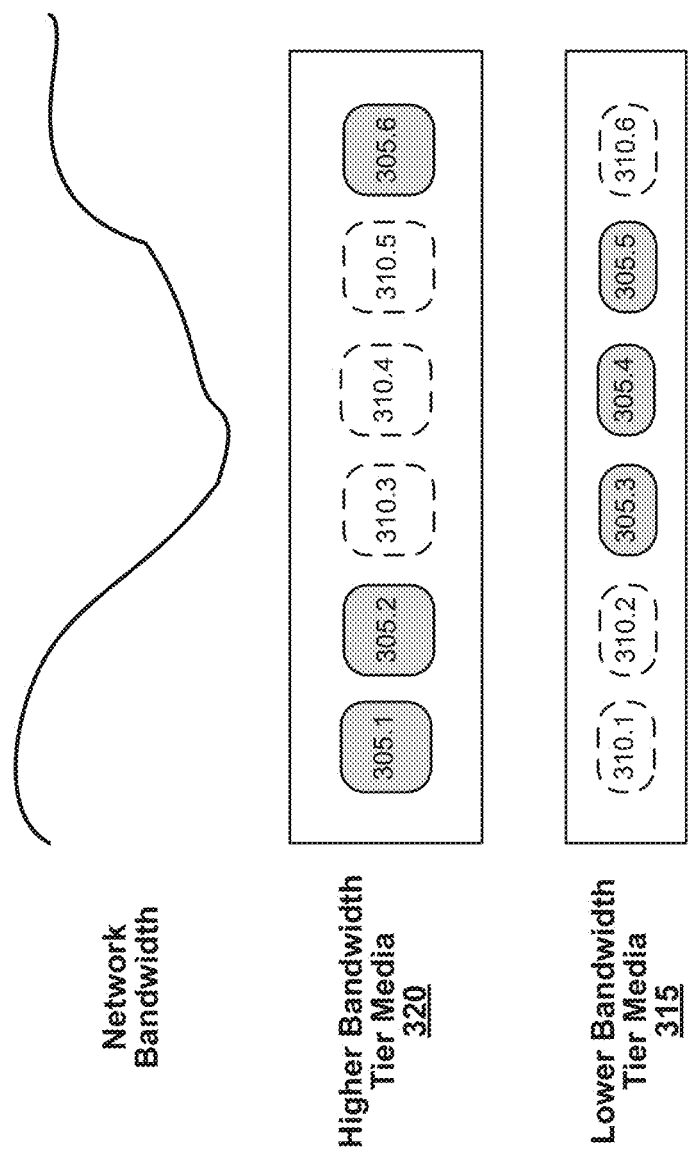
FIG. 3 illustrates exemplary media resource downloads in a system having network bandwidth fluctuations according to an embodiment of the present invention.

FIG. 3 illustrates exemplary media resource downloads in a system having network bandwidth fluctuations according to an embodiment of the present invention. As shown in FIG. 3, segments within media files for two different tiers (a higher tier 320 and lower tier 315) might be retrieved and stored in corresponding local resume files for a movie package. In FIG. 3, when the bandwidth is higher, the higher bandwidth segments are retrieved and stored locally in the higher tier resume file. When network bandwidth drops, media data is retrieved for the lower tier and stored in the lower tier resume file. When bandwidth recovers, the next higher bandwidth segment is retrieved and also stored in the higher bandwidth resume file. When download of the movie package has completed, the media resource data stored in both the lower tier and higher tier resume files will be moved or transformed to locally stored files that are accessible via the local URI for the movie package. The remote segments that are not retrieved 310.1-310.6 remain accessible at the respective remote URI for later download as desired and the local segments 305.1-305.6 are stored in the appropriate local media files. Then the movie may be played from the locally stored version by switching between locally stored tier files during playback.

An audio track may be downloaded in its entirety at a separate stage from the video content. Audio and video streams of a movie package need not be retrieved at the same time as the movie package can store the streams separately. Thus the available bandwidth for download might be dedicated to video alone once the audio track has completed download.

Because the locally stored movie package contains media for the entire movie timeline, the complete movie remains watchable when the client device is no longer connected to the remote server. Various portions of the movie retrieved during different download conditions may be displayed at different qualities. Therefore, although there may not be a complete version for any single tier, playback of the entire movie works because the media player will switch tiers based upon what media is locally available.

According to an embodiment, missing media, or portions of the movie downloaded at a lower quality tier may be "backfilled" when an appropriate network connection is available. Certain user settings may facilitate backfill of movie packages. For example, the user may indicate that any pending backfill requests will be completed whenever the requesting device is connected to a WiFi network. Additionally, the user may indicate that movies marked as "favorites" should always be backfilled at the highest quality possible.

When movie packages are updated at the remote location, the user may be notified of the update and given the option to download the updated media files at the next opportunity, or such updates may be automatically pushed to the user's device.

Figure 4:
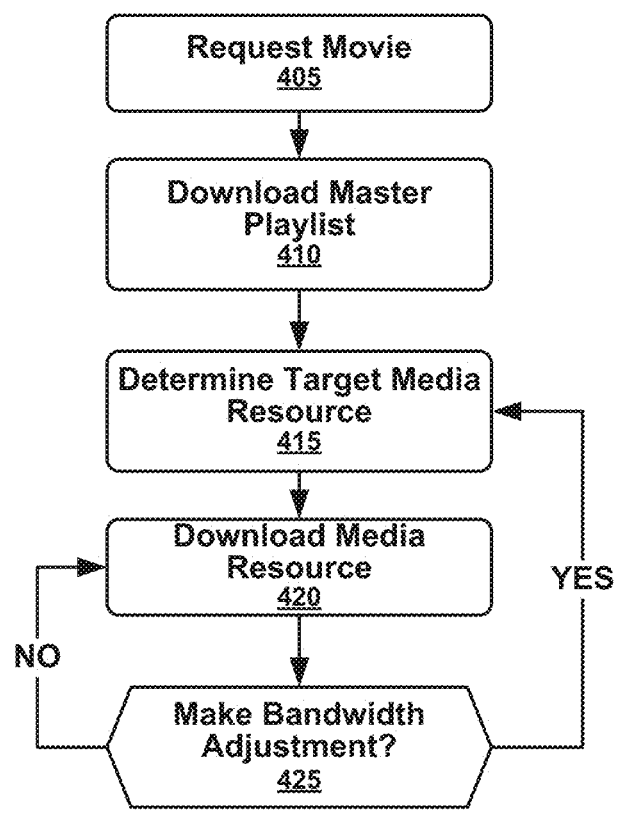
FIG. 4 illustrates an exemplary method for accessing a movie package according to an embodiment of the present invention.

FIG. 4 illustrates an exemplary method 400 for accessing a movie package according to an embodiment of the present invention. As shown in FIG. 4, a user may choose to download and view a movie stored at a remote location (block 405). The user's client device will then access and download the master playlist for the movie package to identify the available media resources (block 410). Using the information in the master playlist, a target media resource having the best quality that the device will be capable of decoding and displaying will be selected (block 415). Then the target media resource will be downloaded (block 420). If a different bandwidth is needed, for example, if the available network bandwidth deteriorates (block 425), then the client device may again refer to the master playlist to identify a new target media resource that is available at an alternate bandwidth (block 430). The client device will then download the new media resource, resuming where the previous download left off in the timeline of the movie (block 420). The user will be able to view the downloaded media resources on the local device as they are downloaded to a file at the local device and will be able to view all downloaded content when the device is no longer connected to the remote location.

In some situations, it may be preferable to download an entire movie, or to complete download of a movie in progress, when a certain network type is available. For example, when a WiFi network is currently available for a limited time and it is probable that an LTE network will have limited connectivity. Then the user can indicate the time limit for retrieving the movie package, which will set a deadline for completing the download. The requesting device may need to select another tier of the movie in order to complete the download by the deadline. The tier may be selected based on which tier has the highest quality that can be downloaded by the deadline with the current network connectivity limitations.

Even as it makes progress in downloading the relevant tier of the movie package, the movie remains watchable. When the download completes in advance of the deadline, the movie is then viewable for local playback in its entirety.

Figure 5:
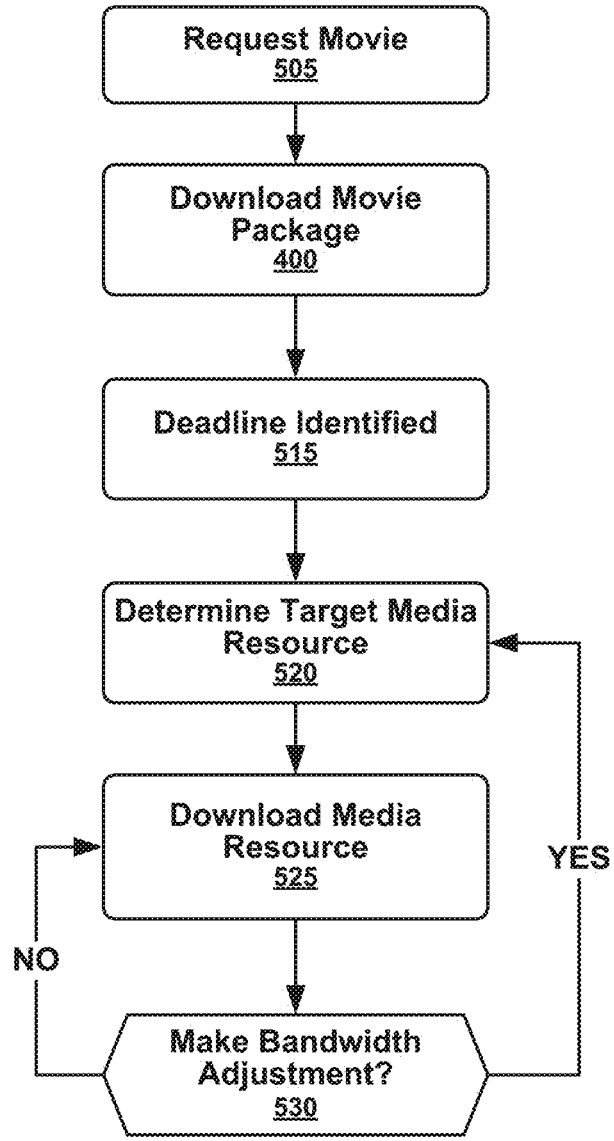
FIG. 5 illustrates an exemplary method for accessing a movie package under a deadline according to an embodiment of the present invention.

FIG. 5 illustrates an exemplary method 500 for accessing a movie package under a deadline according to an embodiment of the present invention. As shown in FIG. 5, a user may choose to download and view a movie stored at a remote location (block 505). The user's client device will then access and download the movie package as described with reference to FIG. 4 above. Then, the user may set a deadline for retrieving the selected movie package (block 515). Using the information in the master playlist, a target media resource having the best quality that the device can be retrieved within the deadline will be identified (block 520). Then the target media resource will be downloaded (block 525). Again, if a different bandwidth is needed, for example, if the available network bandwidth deteriorates and the selected target media resource may no longer be retrieved within the deadline (block 530) the client device may again refer to the master playlist to identify a new target media resource that is available at an alternate bandwidth (block 520). The client device will then download the new media resource, resuming where the previous download left off in the timeline of the movie (block 525).

As previously noted, movie packages have discrete media files. Such discrete files make movie packages highly extendable such that new or updated media files can be delivered without any effect on the unchanged media files. This allows multiple different media files to be combined, added, or updated in a movie package over time. For example, new subtitle tracks for new languages, new commentary tracks, or tiers at new quality levels may be added at any time for existing movie packages.

Figure 6:
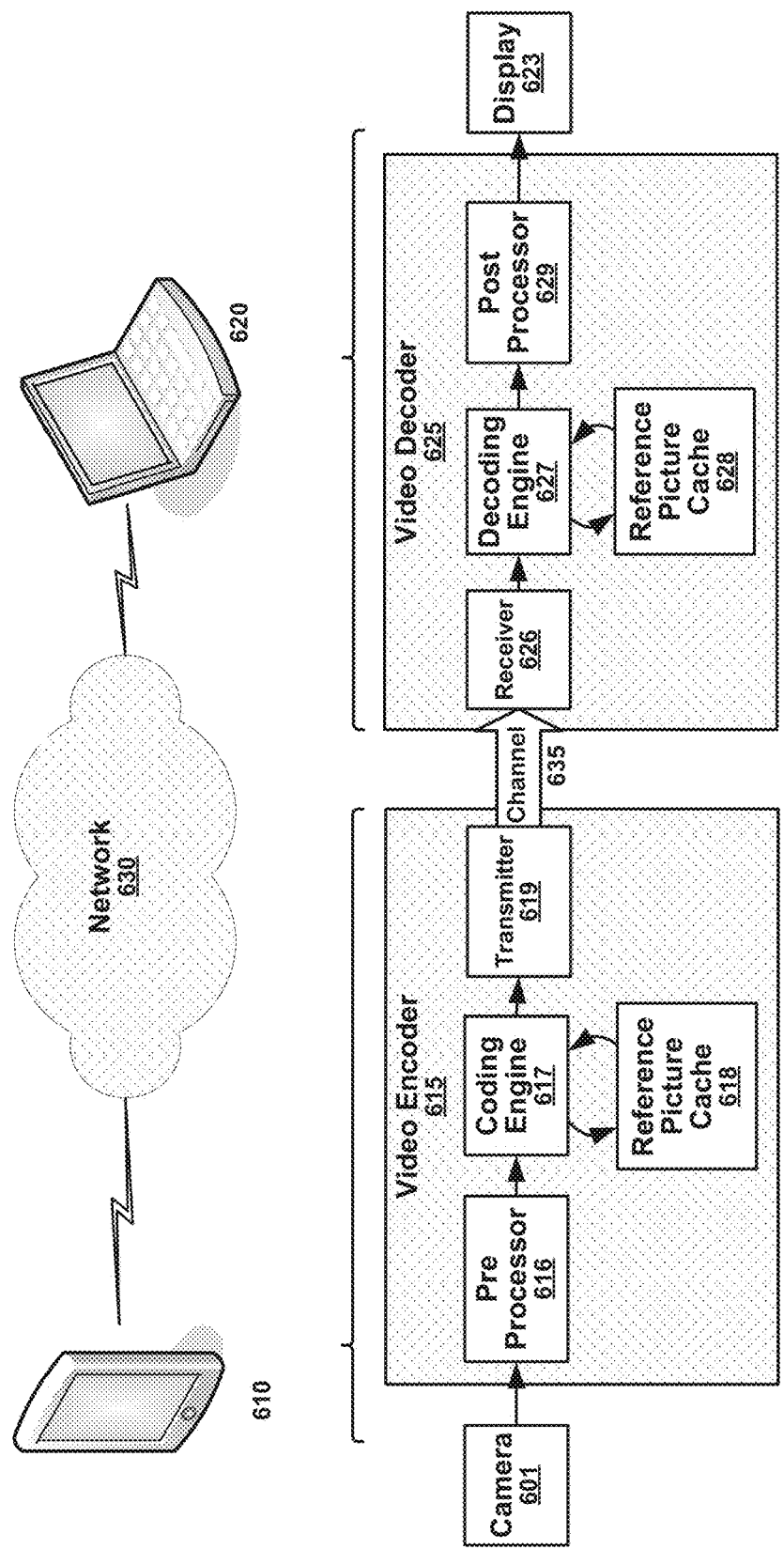
FIG. 6 is a simple functional block diagram illustrating an exemplary video communication system according to an embodiment of the present invention

FIG. 6 is a simple functional block diagram of an exemplary video communication system 600 according to an embodiment of the present invention. As shown in FIG. 6, two client devices may be exchanging video via a network connection. Conventionally, each client device will have an encoder that codes a source video sequence into a coded representation that has a smaller bit rate than does the source video and, thereby achieve data compression. However, this may cause a decrease in the quality of the transmitted media, for example, by encoding the captured video data at a lower resolution. Where the data is captured in a high quality source stream, the high quality version of the transmission may be stored and made available on a server at a later date, thereby preserving the recorded event in high quality video.

As shown in FIG. 6, an exemplary video coding system may include an encoder system 610 and a decoder system 620 provided in communication via a channel 630. The encoder system 610 may accept source video captured at the client device and may code the source video as coded video. The encoder system 610 may output the coded video data to the channel 630, which may be a storage device, such as an optical, magnetic or electrical storage device, or a communication channel formed by a computer network or a communication network.

The decoder system 620 may retrieve the coded video data from the channel 630, invert the coding operations performed by the encoder system 610 and output decoded video data to an associated display device. As shown, the system 600 supports video coding and decoding in one direction only. However, according to an embodiment, video may be captured at each terminal and bidirectional communication may be achieved with an encoder and a decoder implemented at each terminal.

FIG. 6 further illustrates a simplified block diagram illustrating components of an exemplary encoder 615 according to an embodiment of the present invention The encoder 615 may receive an input source video sequence from a video source such as a camera 601.

The encoder 615 may operate according to a predetermined multi-stage protocol, such as HEVC, H.263, H.264, or MPEG-2. The coded video data, therefore, may conform to a syntax specified by the protocol being used. The encoder may additionally select from or be assigned one of a variety of coding modes to code the video data, where each different coding mode yields a different level of compression, depending upon the content of the source video. For example, encoder 615 may parse source video frames according to regular arrays of pixel data (e.g., 8×8 or 16×16 blocks), called "pixel blocks" herein, and may code the pixel blocks according to block prediction and calculation of prediction residuals, quantization and entropy coding.

As previously noted, the resulting compressed sequence may be transmitted to a decoder via a channel 635. The coded frames or pixel blocks may then be output from the encoder 615 and stored at a buffer or transmitter (not shown) where they may be combined into a common bit stream to be delivered by the transmission channel 635 to a decoder, terminal, or data storage. As part of its operation, the transmitter may observe performance of the network and develop statistics on such performance. For example, the transmitter may estimate the bandwidth of a channel 635 that the network can provide to the terminal 610. In many networking applications, network channels provide variable data rates for transmission, which change without notice to the transmitting terminals. The transmitter may receive indicators from the channel 635 or from the far-end terminal 620 identifying transmission failures, transmission latencies and other indicators of network performance from which the transmitter may estimate network performance. The transmitter may provide channel statistics that may indicate a degradation in connectivity.

To recover the video data, the bitstream may be decompressed at the decoder, by inverting the coding processes performed by the encoder, yielding a received decoded video sequence. The decoder 625 may output a recovered video sequence for rendering on the display 623 or, optionally, stored to memory for later retrieval and display.

When a real time video call is established between two devices such as those shown in FIG. 6, the participants may elect to record the video and/or audio of the call. Each device may then store the audio and/or video media data of the conversation captured by the respective device as a local high resolution media resource and the audio and/or video media data received from the other device as a local low resolution media resource of a new movie package. In this way, each user has a movie package that includes a complete recording of the call.

The user of either device may then upload the local copy of the movie package to a server or otherwise upload via the cloud or share directly with each other. Then they can share a link to the uploaded movie package with other participants. Thus that participant's side of the call, including the higher resolution recorded by the participant's device, will be available to the other participants. When the second participant uploads their local version of the call, their local versions will be added to the already uploaded versions such that a movie package for the call will be available at the server with media resources for the complete call in both high and low resolutions.

According to an embodiment, when the recording is started, an identifier is created to tie the two sides of the conversation together. When uploaded to the server, the first movie package (or a version based upon it) contains this identifier. When the other side decides to share their side of the conversation, their shared movie package carries the same identifier. The two movie packages are then associated at the server because they contain the same identifier indicating that the two movie packages are compatible. Then, instead of creating multiple movie packages on the server, the video and audio from the second participant will be combined directly into the first uploaded movie package. In this same manner, video from multiple camera angles on the same timeline may be combined into a single movie package. Other identifiers or suitable mechanisms for matching together the individual recordings of the video call may also be utilized.

Although a video call as described herein primarily refers to a real-time exchange of both audio and video between remote participants, other data exchanges are also anticipated. For example, a video call may include an exchange of only audio data from one or both participants. Additionally, more than two participants at different locations may be considered as participating in a video call as described herein.

Figure 7:
FIG. 7 illustrates an exemplary method for creating a movie package from multiple recordings according to an embodiment of the present invention.

FIG. 7 illustrates an exemplary method 700 for creating a movie package from multiple recordings according to an embodiment of the present invention. As shown in FIG. 7, multiple participants may begin a video call (block 705). Then if one or more participants choose to record the call (block 710), a movie package is created to capture the call (block 715) and a unique identifier is created to identify all recordings made during the call (block 720). During recording, high resolution media resources are created from the locally captured portions of the video call (block 725) and low resolution media resources are created from the received portions of the video call (block 730). Then, when the call is complete each participant may choose to upload the created movie package to a remote location (block 735). Uploaded movie packages will be identified by the unique identifier and when matching identifiers are found (block 740), the media resources of each upload will be combined into a single movie package (block 745).

A movie package can grow to hold new media by adding more tracks and updating the bookkeeping in the master playlist to reference the new media streams. When a remote movie package is updated, users may be notified about the updated package and have an option to download an updated version.

The master playlist of a movie package can be changed by writing a new master playlist file with a new name into the movie package and then updating the top level file to point at the new master playlist. The top level file may continue to reference a record of older master playlist files even after the updated master playlist is added if previous versions are desired. If the newer and older master playlists both reference the same media resource files, any resume or local media resource files already in the movie package can still be used without requiring any update or additional download.

In some instances, where it is desirable to remove older, obsolete media resources to preserve disk space, a differencing operation may be performed between all media referenced in the newest master playlist and all media referenced in the previous master playlists. If there are resources identified that are no longer needed, they may be removed form the movie package. When the removal completes, the older master playlists can also be removed.

As discussed above, FIGS. 1 and 6 illustrate functional block diagrams of exemplary systems according to an embodiment of the present invention. In implementation, the systems may be embodied as hardware, in which case, the illustrated blocks may correspond to circuit sub-systems within the systems. Alternatively, the components of the systems may be embodied as software, in which case, the blocks illustrated may correspond to program modules within software programs. In yet another embodiment, the systems may be hybrid systems involving both hardware circuit systems and software programs.

Moreover, not all of the functional blocks described herein need be provided or need be provided as separate units. For example, although FIG. 6 illustrates the components of an exemplary system, such as the decoding engine and post-processor as separate units, in one or more embodiments, some or all of them may be integrated. Such implementation details are immaterial to the operation of the present invention unless otherwise noted above. Additionally, although FIGS. 4, 5, and 7 illustrates exemplary methods, the order of operations may be altered or some operations skipped entirely.

Some embodiments may be implemented, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine-readable storage medium. In addition, a server or database server may include machine-readable media configured to store machine executable program instructions. The features of the embodiments of the present invention may be implemented in hardware, software, firmware, or a combination thereof and utilized in systems, subsystems, components or subcomponents thereof. The machine-readable storage media may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for building at a client device a local movie package for offline playback from a movie package stored at a remote location, the method comprising:
   downloading a master playlist for a requested remote movie package, the playlist identifying content segments of the movie package arranged in a plurality of tiers;
   based on a characteristic of the client device, from the master playlist, identifying segments of the movie package from a first tier that can be played by the client device;
   determining a deadline for download before commencing download of segments from the first tier;
   commencing download of segments of the movie package from the identified first tier;
   during the download, determining whether all segments of the first tier of the movie package can be downloaded within the deadline for download; and
   upon determining that all segments of the first tier of the movie package cannot be downloaded within the deadline:
      identifying from the master playlist segments of the movie package from a second tier to be downloaded;
      stopping the download of the segments of the first tier at a stopping point in a timeline of the movie package;
      commencing download of segments of the movie package from the second tier beginning at the stopping point;
      building a local movie package from the downloaded segments of the first and second tiers of the movie package, wherein the local movie package includes a local playlist with local references to the downloaded segments of the first and second tiers; and
   storing the local movie package locally at the client device, wherein the local movie package is available for playback on the client device when the client device is no longer accessing the remote location.

2. The method of claim 1, wherein a detected change in bandwidth indicates that less bandwidth is available and the movie package from the second tier has a lower bitrate than the movie package from the first tier.

3. The method of claim 1, wherein a detected change in bandwidth indicates that more bandwidth is available and the movie package from the second tier has a higher quality than the movie package from the first tier.

4. The method of claim 2, further comprising, after completing the storing of the local movie package to the client device and upon detection of bandwidth available for downloading:
   retrieving missed data from the movie package from the first tier, and
   replacing corresponding portions of the movie package that were built from the movie package from the second tier with the retrieved missed data from the movie package from the first tier.

5. The method of claim 1, further comprising accessing the movie package from the first tier via a remote uniform reference identifier (URI) referenced in the master playlist.

6. The method of claim 1, further comprising accessing the movie package from the second tier via a remote URI referenced in the master playlist.

7. The method of claim 1, further comprising during download, storing the downloaded movie package locally at the client device at a location identified by a resume URI provided in the master playlist.

8. The method of claim 7, further comprising upon completing download of the movie package, moving the downloaded movie package to a local URI referenced in the master playlist.

9. The method of claim 1, wherein upon adding a new file to the remote movie package, downloading the new file to the local movie package.

10. The method of claim 9, further comprising updating the master playlist to reflect the new file.

11. The method of claim 1, further comprising during download of the movie package, beginning playback of the movie package.

12. The method of claim 11, wherein the movie package is played back from a resume URI referenced by the master playlist.

13. The method of claim 1, wherein the downloaded movie package is played back from a local URI referenced by the master playlist.

14. The method of claim 1, further comprising referencing the master playlist to determine segments of the movie package from a third tier that can be downloaded within the available time, and downloading the segments of the movie package from the third tier to the local movie package on the client device beginning at a new detected stopping point in the movie package timeline.

15. A non-transitory computer readable medium storing program instructions that, when executed by a processing device, cause the device to:
- download a master playlist for a requested remote movie package, the playlist identifying content segments of the movie package arranged in a plurality of tiers;
- determining a deadline for download before commencing download of segments from the identified first tier;
- based on a characteristic of a client device, from the master playlist, identify segments of the movie package from a first tier that can be played by the processing device;
- commence downloading of segments of the movie package from the identified first tier;
- during the download, determining whether all segments of the first tier of the movie package can be downloaded within the deadline for download; and
- upon determining that all segments of the first tier of the movie package cannot be downloaded within the deadline:
  - identify from the master playlist segments of the movie package from a second tier to be downloaded;
  - stop the download of the segments of the first tier at a stopping point in a timeline of the movie package;
  - commence downloading of segments of the movie package from the second tier beginning at the stopping point;
  - build a local movie package from the downloaded segments of the first and second tiers of the movie package, wherein the local movie package includes a local playlist with local references to the downloaded segments of the first and second tiers; and
  - store the local movie package locally at the client device, wherein the local movie package is available for playback on the processing device when the processing device is no longer accessing a remote location.

16. The non-transitory computer readable medium of claim 15, wherein a detected change in bandwidth indicates that less bandwidth is available and the movie package from the second tier has a lower bitrate than the movie package from the first tier.

17. The non-transitory computer readable medium of claim 15, wherein a detected change in bandwidth indicates that more bandwidth is available and the movie package from the second tier has a higher quality than the movie package from the first tier.

18. The non-transitory computer readable medium of claim 17, wherein the instructions further cause the processing device to, after completing storing of the local movie package and upon detection of bandwidth available for downloading:
- retrieve missed data from the movie package from the first tier, and
- replace corresponding portions of the movie package that were built from the movie package from the second tier with the retrieved missed data from the movie package from the first tier.

19. The non-transitory computer readable medium of claim 15, wherein the instructions further cause the processing device to access the movie package from the first tier via a remote uniform reference identifier (URI) referenced in the master playlist.

20. The non-transitory computer readable medium of claim 15, wherein the instructions further cause the processing device to access the movie package from the second tier via a remote URI referenced in the master playlist.

21. The non-transitory computer readable medium of claim 15, wherein the instructions further cause the processing device to store the downloaded movie package locally at the device at a location identified by a resume URI provided in the master playlist.

22. The non-transitory computer readable medium of claim 21, wherein the instructions further cause the processing device to move the downloaded movie package to a local URI referenced in the master playlist upon completing the download.

23. The non-transitory computer readable medium of claim 15, wherein the instructions further cause the processing device to reference the master playlist to determine segments of the movie package from a third tier that can be downloaded within a received deadline, and download the segments of the movie package from the third tier to the local movie package on the processing device beginning at a new detected stopping point in the movie package timeline.

24. A method for retrieving at a client device a movie package from a remote location, the method comprising:
- downloading a master playlist for a requested remote movie package, the playlist identifying content segments of the movie package arranged in a plurality of tiers;
- identifying a deadline for downloading the movie package;
- recursively, as communication resources change and until a representation of the movie package is downloaded across the movie package's entire timeline:
  - from the master playlist, identifying segments of the movie package from a first tier that can be played by the client device and can be downloaded prior to the identified deadline based on communication resources; and
  - commencing download of segments of the movie package from the identified first tier;
  - during the download, determining whether all segments of the first tier of the movie package can be downloaded within the deadline;
  - upon determining that all segments of the first tier of the movie package cannot be downloaded within the deadline:
    - identifying from the master playlist segments of the movie package from a second tier to be downloaded;
    - stopping the download of the segments of the first tier at a stopping point in a timeline of the movie package;
    - commencing download of segments of the movie package from the second tier beginning at the stopping point;
    - building a local movie package from the downloaded segments of the first and second tiers of the movie package, wherein the local movie package includes a local playlist with local references to the downloaded segments of the first and second tiers; and storing the local movie package locally at the client device.

25. The method of claim 24, further comprising, after completing the storing of the local movie package to the client device and upon detection of bandwidth available for downloading:

retrieving missed data from the first tier of the movie package; and replacing corresponding portions of the movie package that were built from the second tier of the movie package with the retrieved missed data from the first tier of the movie package.

26. The method of claim 24, further comprising accessing the first tier of the movie package via a remote uniform reference identifier (URI) referenced in the master playlist.

27. The method of claim 24, further comprising accessing the second tier of the movie package via a remote (URI) referenced in the master playlist.

28. The method of claim 24, further comprising during download, storing the movie package locally at the client device at a location identified by a resume URI provided in the master playlist.

29. The method of claim 28, further comprising upon completing the download of the movie package, moving the movie package to a local URI referenced in the master playlist.

30. The method of claim 24, further comprising during download of the movie package, beginning playback of the movie package.

31. The method of claim 30, wherein the movie package is played back from a resume URI referenced by the master playlist.

32. The method of claim 24, wherein when the client device is no longer connected to the remote location, a downloaded movie package is played back from a local URI referenced by the master playlist.

33. A non-transitory computer readable medium storing program instructions that, when executed by a processing device, cause the device to:

download a master playlist for a requested remote movie package, the playlist identifying content segments of the movie package arranged in a plurality of tiers;

identify a deadline for downloading the movie package;

recursively, as communication resources change and until a representation of the movie package is downloaded across the movie package's entire timeline:

from the master playlist, identify segments of the movie package from a first tier that can be played by the processing device and can be downloaded prior to the identified deadline for downloading based on communication resources; and commence downloading of segments of the movie package from the identified first tier;

during the download, determine whether all segments of the first tier of the movie package can be downloaded within the deadline;

upon determining that all segments of the first tier of the movie package cannot be downloaded within the deadline:

identify from the master playlist segments of the movie package from a second tier to be downloaded;

stop the download of the segments of the first tier at a stopping point in a timeline of the movie package;

commence downloading of segments of the movie package from the second tier beginning at the stopping point;

build a local movie package from the downloaded segments of the first and second tiers of the movie package, wherein the local movie package includes a local playlist with local references to the downloaded segments of the first and second tiers; and store the local movie package locally at a client device.

34. The non-transitory computer readable medium of claim 33, further comprising, after completing the storing of the local movie package to the client device and upon detection of bandwidth available for downloading:

retrieving missed data from the first tier of the movie package; and replacing corresponding portions of the movie package that were built from the second tier of the movie package with the retrieved missed data from the first tier of the movie package.

35. The non-transitory computer readable medium of claim 33, further comprising accessing the first tier of the movie package via a remote uniform reference identifier (URI) referenced in the master playlist.

36. The non-transitory computer readable medium of claim 33, further comprising accessing the second tier of the movie package via a remote (URI) referenced in the master playlist.

37. The non-transitory computer readable medium of claim 33, further comprising during download, storing the downloaded movie package locally at the client device at a location identified by a resume URI provided in the master playlist.

38. The non-transitory computer readable medium of claim 33, further comprising during download of the movie package, beginning playback of the movie package.

39. The non-transitory computer readable medium of claim 33, wherein when the client device is no longer connected to a remote location, the downloaded movie package is played back from a local URI referenced by the master playlist.

40. The method of claim 1, further comprising, after storing the local movie package:

identifying portions of the local movie package that were built from downloaded segments of a tier other than the first tier of the movie package, downloading segments of the first tier of the movie package that correspond to the identified portions of the local movie package; and replacing the identified portions of the local movie package with the downloaded segments of the first tier of the movie package that correspond to the identified portions.

41. The method of claim 1, wherein the stored local movie package represents the movie package stored at a remote location across its entire timeline.

42. The non-transitory computer readable medium of claim 15, wherein the instructions further cause the processing device to, after storing the local movie package:

identify portions of the local movie package that were built from downloaded segments of a tier other than the first tier of the movie package, download segments of the first tier of the movie package that correspond to the identified portions of the local movie package; and replace the identified portions of the local movie package with the downloaded segments of the first tier of the movie package that correspond to the identified portions.

43. The non-transitory computer readable medium of claim 15, wherein the stored local movie package represents the movie package stored at a remote location across its entire timeline.

44. The method of claim 24, further comprising, after storing the local movie package:
- identifying portions of the local movie package that were built from downloaded segments of a tier other than the first tier of the movie package,
- downloading segments of the first tier of the movie package that correspond to the identified portions of the local movie package; and
- replacing the identified portions of the local movie package with the downloaded segments of the first tier of the movie package that correspond to the identified portions.

45. The method of claim 24, wherein the stored local movie package represents the movie package stored at a remote location across its entire timeline.

\* \* \* \* \*